(12) United States Patent
Zorgui et al.

(10) Patent No.: US 12,309,801 B2
(45) Date of Patent: May 20, 2025

(54) UPLINK CONFIGURED GRANT RETRANSMISSION INDICATION BUNDLING

(71) Applicant: QUALCOMM Incorporated, San Diego, CA (US)

(72) Inventors: Marwen Zorgui, San Diego, CA (US); Ahmed Attia Abotabl, San Diego, CA (US); Srinivas Yerramalli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 368 days.

(21) Appl. No.: 17/808,085

(22) Filed: Jun. 21, 2022

(65) Prior Publication Data

US 2023/0413275 A1    Dec. 21, 2023

(51) Int. Cl.
*H04W 4/00* (2018.01)
*H04L 1/08* (2006.01)
*H04L 1/1812* (2023.01)
*H04L 5/00* (2006.01)
*H04W 72/20* (2023.01)
*H04W 72/23* (2023.01)

(52) U.S. Cl.
CPC .............. *H04W 72/23* (2023.01); *H04L 1/08* (2013.01); *H04L 1/1812* (2013.01); *H04L 5/0051* (2013.01); *H04W 72/20* (2023.01)

(58) Field of Classification Search
CPC ........ H04W 72/23; H04W 72/20; H04L 1/08; H04L 1/1812; H04L 5/0051
See application file for complete search history.

(56) References Cited

U.S. PATENT DOCUMENTS

| | | | |
|---|---|---|---|
| 2020/0037354 A1* | 1/2020 | Li | H04W 74/0808 |
| 2020/0314889 A1* | 10/2020 | Cirik | H04W 72/23 |
| 2021/0037561 A1* | 2/2021 | Lyu | H04L 27/2626 |
| 2021/0219333 A1* | 7/2021 | Xu | H04W 72/0453 |
| 2022/0210823 A1* | 6/2022 | Alfarhan | H04L 1/1822 |
| 2022/0330317 A1* | 10/2022 | Lee | H04W 76/20 |
| 2022/0353943 A1* | 11/2022 | Lee | H04W 76/19 |
| 2022/0400496 A1* | 12/2022 | Gerami | H04W 72/1263 |
| 2024/0154775 A1* | 5/2024 | Ying | H04L 5/0053 |
| 2024/0260055 A1* | 8/2024 | Park | H04W 72/25 |

* cited by examiner

*Primary Examiner* — Abdelnabi O Musa
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive downlink control information (DCI) associated with a plurality of configured grant (CG) transmissions, wherein the DCI includes a retransmission request associated with one or more of the plurality of CG transmissions. The UE may transmit one or more retransmissions of the one or more of the plurality of CG transmissions based at least in part on receiving the DCI. Numerous other aspects are provided.

30 Claims, 10 Drawing Sheets

UPLINK CONFIGURED GRANT RETRANSMISSION INDICATION BUNDLING

FIELD OF THE DISCLOSURE

Aspects of the present disclosure generally relate to wireless communication and specifically, to techniques and apparatuses for uplink configured grant retransmission indication bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some communications systems, a UE may transmit using a grant configured by a network node. When the UE is in a configured grant transmission scenario, the UE may receive a retransmission indication rather than explicit hybrid automatic repeat request (HARQ) acknowledgment (ACK) feedback. The UE may use a configured grant timer to determine when a potential retransmission of a current configured grant transmission is to occur. The UE may start the timer at transmission of a configured grant and may restart the timer when a retransmission indication (conveying a retransmission request) is received. Similarly, a HARQ retransmission timer may start when the UE transmits an uplink configured grant transmission, and the UE may use the HARQ retransmission timer to determine whether to stay in an active state to monitor for downlink transmissions or to transition to a reduced power state. The UE may set an independent timer for each configured grant occasion. When an uplink configured grant period is relatively small, the UE is frequently monitoring for downlink transmissions. When the UE may is receiving frequent retransmission requests, an uplink configured grant configuration may be poorly aligned to the communication scenario. Additionally, the network node and the UE may consume excess amounts of energy transmitting and receiving the frequent retransmission requests.

SUMMARY

Some aspects described herein relate to a method of wireless communication performed by a user equipment (UE). The method may include receiving downlink control information (DCI) associated with a plurality of configured grant (CG) transmissions, wherein the DCI includes a retransmission request associated with one or more of the plurality of CG transmissions. The method may include transmitting one or more retransmissions of the one or more of the plurality of CG transmissions based at least in part on receiving the DCI.

Some aspects described herein relate to a method of wireless communication performed by a network node. The method may include transmitting DCI associated with a plurality of CG transmissions, wherein the DCI includes a retransmission request associated with one or more of the plurality of CG transmissions. The method may include receiving one or more retransmissions of the one or more of the plurality of CG transmissions based at least in part on transmitting the DCI.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive DCI associated with a plurality of CG transmissions, wherein the DCI includes a retransmission request associated with one or more of the plurality of CG transmissions. The processor-readable code, when executed by the at least one processor, may be configured to cause the user equipment to transmit one or more retransmissions of the one or more of the plurality of CG transmissions based at least in part on receiving the DCI.

Some aspects described herein relate to a network node for wireless communication. The network node may include at least one processor and at least one memory, communicatively coupled with the at least one processor, that stores processor-readable code. The processor-readable code, when executed by the at least one processor, may be configured to cause the network node to transmit DCI associated with a plurality of CG transmissions, wherein the DCI includes a retransmission request associated with one or more of the plurality of CG transmissions. The processor-readable code, when executed by the at least one processor, may be configured to cause the network node to receive one or more retransmissions of the one or more of the plurality of CG transmissions based at least in part on transmitting the DCI.

Some aspects described herein relate to a non-transitory computer-readable medium that stores a set of instructions for wireless communication by a UE. The set of instructions, when executed by one or more processors of the UE, may cause the UE to receive DCI associated with a plurality of CG transmissions, wherein the DCI includes a retransmission request associated with one or more of the plurality of CG transmissions. The set of instructions, when executed by one or more processors of the UE, may cause the UE to transmit one or more retransmissions of the one or more of the plurality of CG transmissions based at least in part on receiving the DCI.

Some aspects described herein relate to a non-transitory computer-readable medium that stores a set of instructions for wireless communication by a network node. The set of instructions, when executed by one or more processors of the network node, may cause the network node to transmit DCI associated with a plurality of CG transmissions, wherein the DCI includes a retransmission request associated with one or more of the plurality of CG transmissions. The set of instructions, when executed by one or more processors of the network node, may cause the network node to receive one or more retransmissions of the one or more of the plurality of CG transmissions based at least in part on transmitting the DCI.

Some aspects described herein relate to an apparatus for wireless communication. The apparatus may include means for receiving DCI associated with a plurality of CG transmissions, wherein the DCI includes a retransmission request associated with one or more of the plurality of CG transmissions. The apparatus may include means for transmitting one or more retransmissions of the one or more of the plurality of CG transmissions based at least in part on receiving the DCI.

Some aspects described herein relate to an apparatus for wireless communication. The apparatus may include means for transmitting DCI associated with a plurality of CG transmissions, wherein the DCI includes a retransmission request associated with one or more of the plurality of CG transmissions. The apparatus may include means for receiving one or more retransmissions of the one or more of the plurality of CG transmissions based at least in part on transmitting the DCI.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
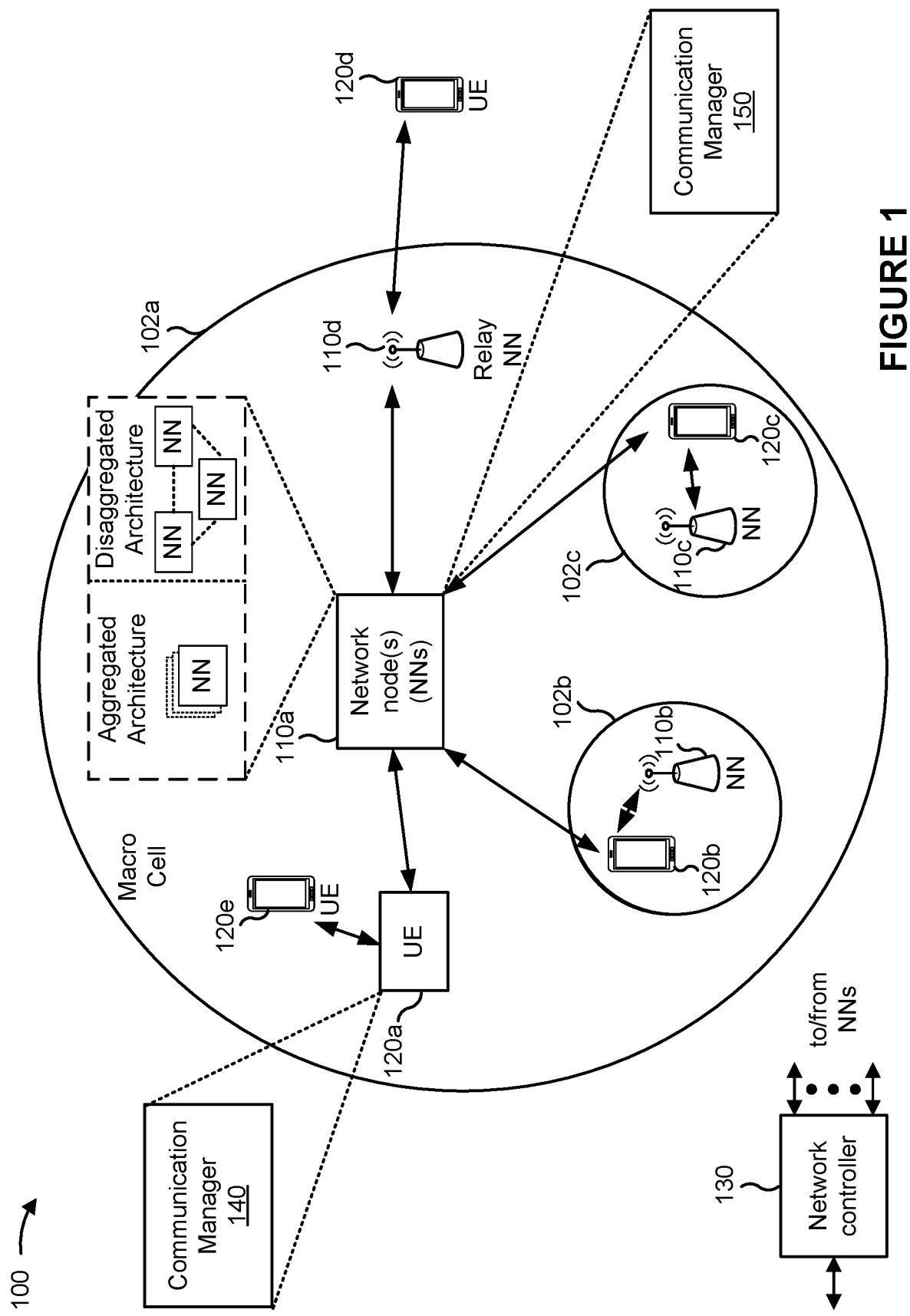
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to uplink configured grant retransmission indication bundling. Some aspects more specifically relate to a UE monitoring a subset of configured grant (CG) retransmission request occasions and receiving downlink control information (DCI) in a monitored CG retransmission request occasion. The DCI may include information identifying a set of CG transmissions that are to be retransmitted. The UE may transmit one or retransmissions to convey the set of CG transmissions that are to be retransmitted based at least in part on receiving the DCI. In some aspects, the DCI may include a bitmap, a demodulation reference signal (DMRS) sequence, or a set of hybrid automatic repeat request (HARQ) process identifiers identifying the set of CG transmissions that are to be retransmitted. In some aspects, a maximum quantity of CG transmissions that can be bundled into a single DCI (and a corresponding quantity of CG retransmission request occasions that the UE can skip monitoring) is a configurable value.

Particular aspects of the subject matter described in this disclosure can be implemented to realize one or more of the following potential advantages. In some examples, the described techniques can be used to reduce a power consumption associated with a network node transmitting and a UE receive CG retransmission requests.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive DCI associated with a plurality of CG transmissions, wherein the DCI includes a retransmission request associated with one or more of the plurality of CG transmissions; and transmit one or more retransmissions of the one or more of the plurality of CG transmissions based at least in part on receiving the DCI. Additionally or alternatively, the communication manager 140 may perform one or more other operations described herein.

In some aspects, the network node 110 may include a communication manager 150. As described in more detail elsewhere herein, the communication manager 150 may transmitting DCI associated with a plurality of CG transmissions, wherein the DCI includes a retransmission request associated with one or more of the plurality of CG transmissions; and receiving one or more retransmissions of the one or more of the plurality of CG transmissions based at least in part on transmitting the DCI. Additionally or alternatively, the communication manager 150 may perform one or more other operations described herein.

Figure 2:
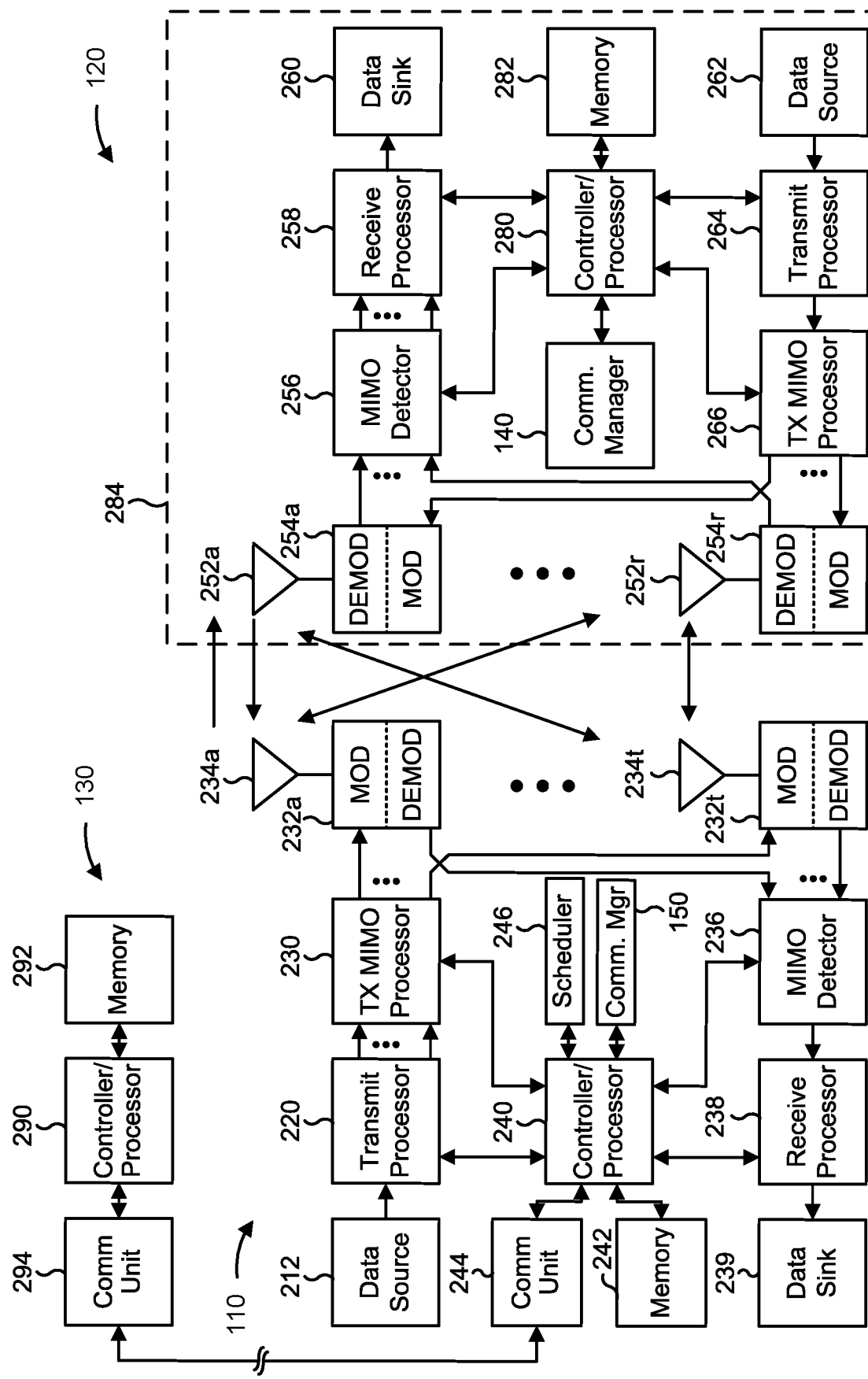
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a DMRS) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with uplink CG retransmission indication bundling, as described in more detail elsewhere herein. For example, the controller/processor 240 of the network node 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, UE 120 may include means for receiving DCI associated with a plurality of CG transmissions, wherein the DCI includes a retransmission request associated with one or more of the plurality of CG transmissions or means for transmitting one or more retransmissions of the one or more of the plurality of CG transmissions based at least in part on receiving the DCI. In some aspects, such means may include one or more components of UE 120 described in connection with FIG. 2, such as controller/processor 280, transmit processor 264, TX MIMO processor 266, antenna 252, modem 254, MIMO detector 256, or receive processor 258.

In some aspects, network node 110 may include means for transmitting DCI associated with a plurality of CG transmissions, wherein the DCI includes a retransmission request associated with one or more of the plurality of CG transmissions, means for receiving one or more retransmissions of the one or more of the plurality of CG transmissions based at least in part on transmitting the DCI. In some aspects, such means may include one or more components of network node 110 described in connection with FIG. 2, such as antenna 234, MIMO detector 236, receive processor 238, controller/processor 240, transmit processor 220, TX MIMO processor 230, or modem 232, antenna 234.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
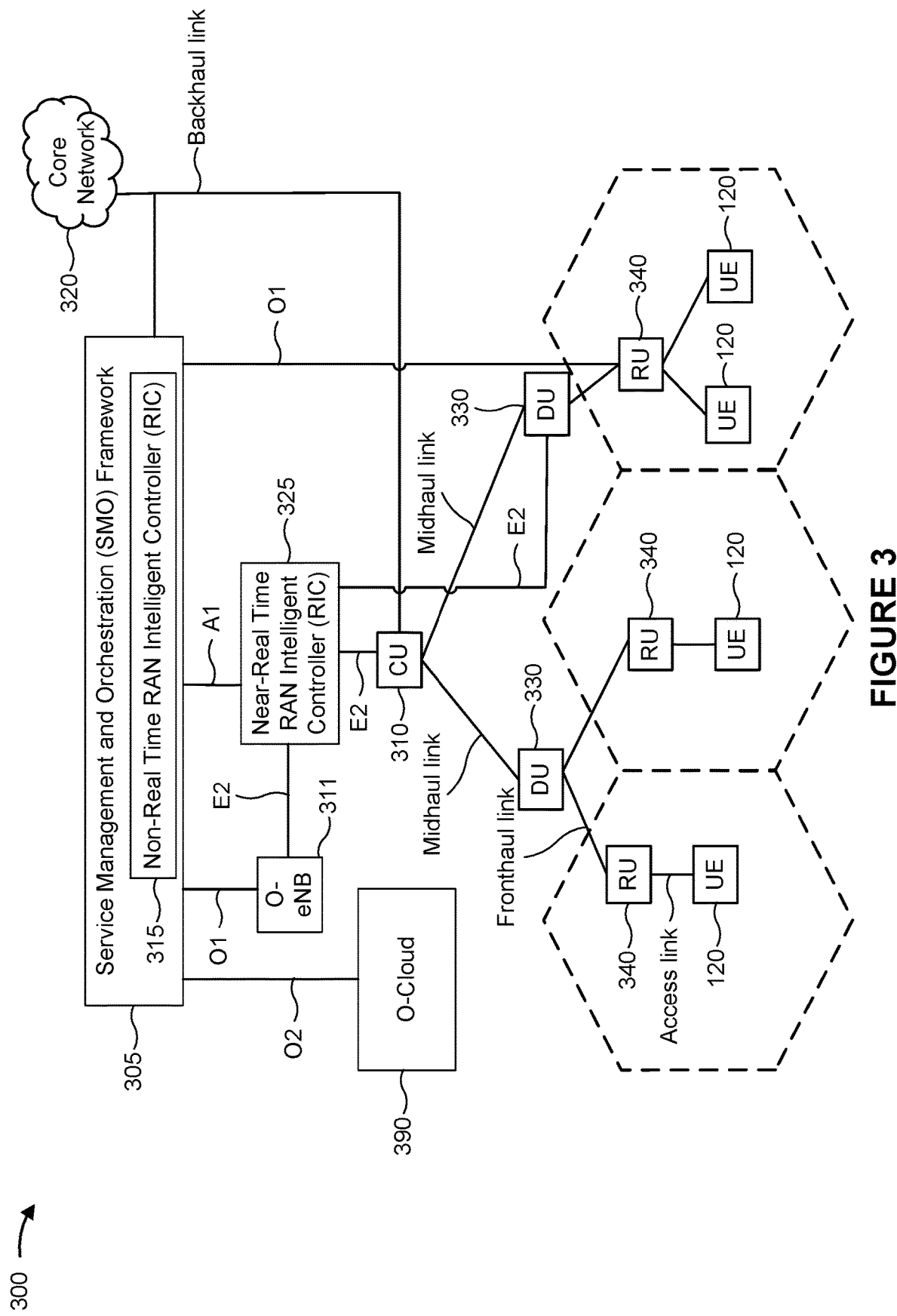
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an IFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
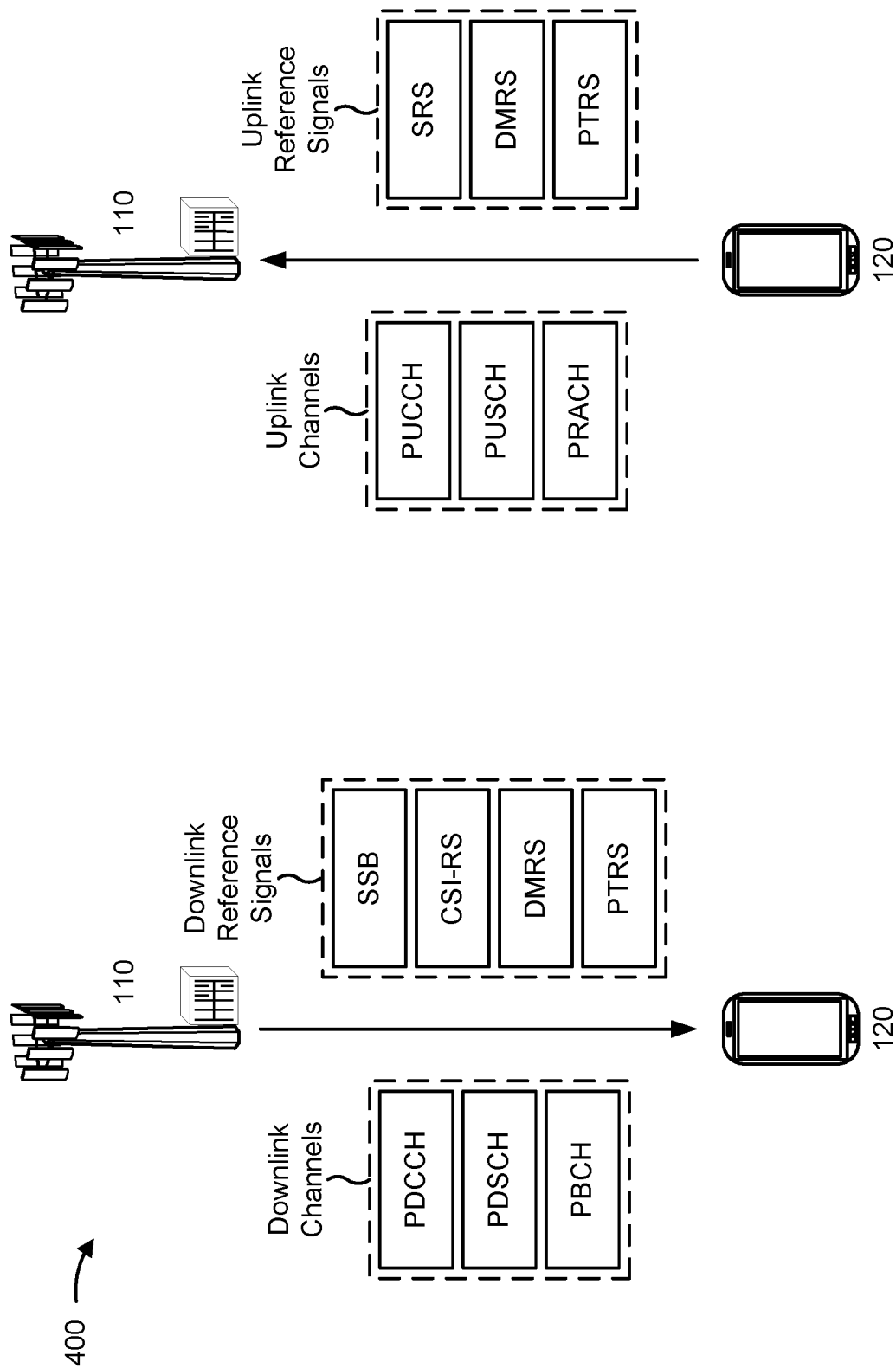
FIG. 4 is a diagram illustrating an example of physical channels and reference signals in a wireless network in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries DCI, a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. The UE 120 may transmit acknowledgement (ACK) or negative acknowledgement (NACK) feedback (ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PB CH) block. The network node 110 may transmit multiple SSBs on multiple corresponding beams, and the SSBs may be used for beam selection.

A CSI-RS may carry information used for downlink channel estimation (downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (a rank), a precoding matrix (a precoder), an MCS, or a refined downlink beam (using a beam refinement procedure or a beam management procedure), among other examples.

A DMRS may carry information used to estimate a radio channel for demodulation of an associated physical channel (PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (on the PDSCH) and uplink communications (on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (a reference cell and one or more neighbor cells), and may report a reference signal time difference (RSTD) based on OTDOA measurements associated with the PRSs received from the multiple cells. The network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

Figure 5:
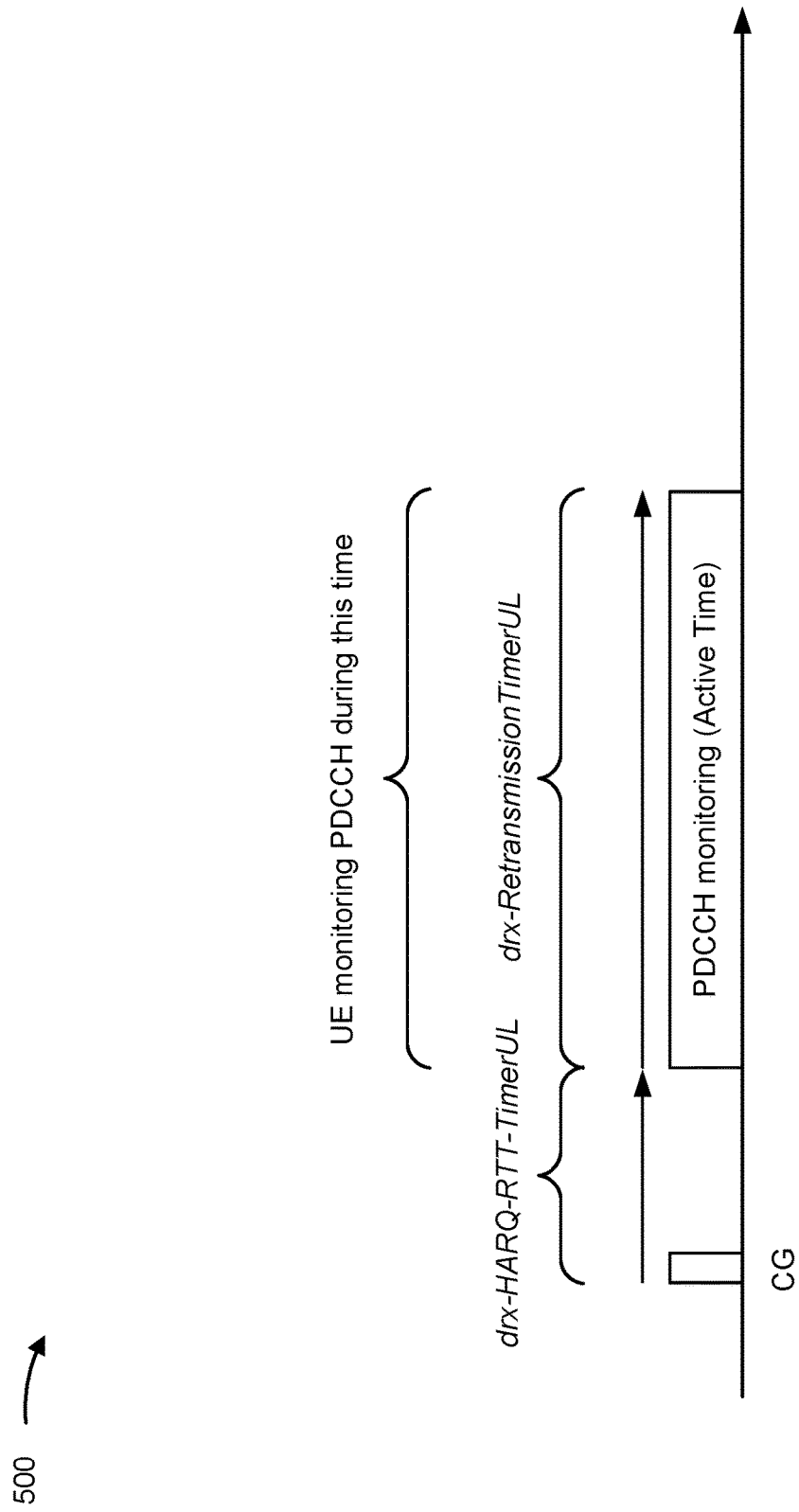
FIG. 5 is a diagram illustrating an example of using a hybrid automatic repeat request (HARQ) retransmission timer in accordance with the present disclosure.

FIG. 5 is a diagram illustrating an example 500 of using a HARQ retransmission timer, in accordance with the present disclosure.

As shown in FIG. 5, a round-trip-time (RTT) timer may start based at least in part on an uplink CG transmission. For example, a UE (the UE 120) may transmit an uplink communication (a PUSCH) using a CG resource and may start an RTT timer (drx-HARQ-RTT-TimerUL). The CG resource may be configured for the UE, which may enable the UE to transmit on an uplink without having received a PDCCH communication granting a resource. In some cases, repetition may be configured for the UE to increase reliability or multiple CG resources may be configured to provide different periodicities for uplink transmissions. A first type of CG resource may be activated by the UE receiving an activation DCI and a second type of CG resource may be used by the UE without having received an activation DCI.

When the RTT timer elapses, the UE may monitor for a PDCCH transmission conveying a DCI triggering a retransmission of the uplink communication. For example, if a network node has not received the uplink communication in the CG resource, the network node may transmit DCI to the UE to trigger the UE to retransmit the uplink communication. The UE may monitor for the DCI for an active time period associated with a retransmission timer (drx-RetransmissionTimerUL). If the UE receives DCI indicating that the UE is to retransmit the uplink communication, the UE may retransmit the uplink communication using an indicated or scheduled uplink resource.

When an uplink CG period is relatively small, a UE may be frequently operating in the active mode to monitor for a PDCCH communication conveying DCI to request retransmission of an uplink communication. In some scenarios, a network node may infrequently transmit retransmission requests. Such scenarios may result in an excessive use of UE resources associated with operating in the active period and frequently monitoring for a PDCCH communication. In other scenarios, the network node may transmit frequent retransmission requests, which may result in an excessive use of network resources associated with conveying the retransmission request DCI in PDCCH communications.

Various aspects relate generally to uplink CG retransmission indication bundling. Some aspects more specifically relate to a network node transmitting a single DCI for a plurality of CG resources. In such aspects, a UE may monitor for a PDCCH conveying the single DCI after only a subset of CG resources rather than after all CG resources. In some aspects, the network node may configure a group of CG resources for which retransmission indications may be bundled, and the UE may monitor for a single DCI for each group of CG resources rather than for each individual CG resource. In such aspects, the UE may receive a single DCI conveying a plurality of retransmission requests and transmit a plurality of retransmissions as a response to the plurality of retransmission requests.

Particular aspects of the subject matter described in this disclosure can be implemented to realize one or more of the following potential advantages. In some examples, the described techniques can be used to reduce an amount of time that a UE operates in an active state and increase an amount of time that the UE operates in a reduced power state, thereby reducing a utilization of power resources. In some examples, the described techniques can be used to reduce a network signaling overhead associated with transmitting DCI to conveying retransmission requests by bundling a plurality of retransmission requests into a single DCI.

Figure 6:
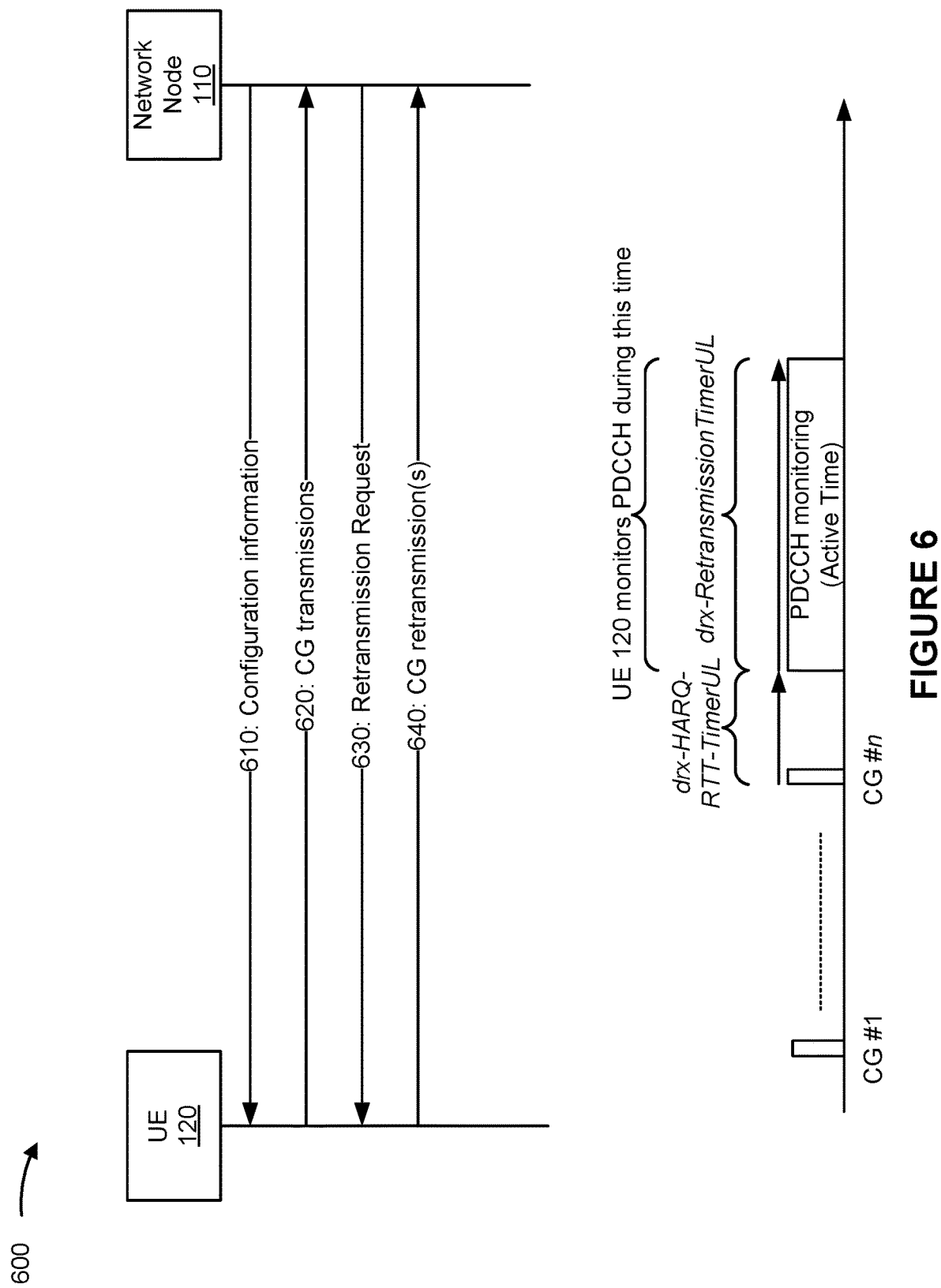
FIG. 6 is a diagram illustrating an example associated with uplink configured grant (CG) retransmission indication bundling in accordance with the present disclosure.

FIG. 6 is a diagram illustrating an example 600 associated with uplink CG retransmission indication bundling, in accordance with the present disclosure. As shown in FIG. 6, example 600 includes communication between a network node 110 and a UE 120.

As further shown in FIG. 6, and in a first operation 610, the UE 120 may receive CG configuration information associated with configuring retransmission indication bundling. For example, the UE 120 may receive, from the network node 110, information indicating a quantity of CG transmissions n for which corresponding retransmission indications are to be bundled into a retransmission request. The UE 120 may receive information updating the quantity n via RRC signaling, medium access control (MAC) control element (CE) signaling, or DCI. In some aspects, the UE 120 may receive an indication of whether to monitor for a retransmission request in a period after a particular CG transmission. For example, the UE 120 may receive information indicating that retransmission indications for a set of n=4 CG transmissions are to be bundled into a single retransmission request. In such an example, the UE 120 may determine to perform monitoring for the single retransmission request after every fourth CG transmission (rather than after every single CG transmission as would occur when there is no retransmission indication bundling).

As further shown in FIG. 6, and in a second operation 620, the UE 120 may attempt to transmit a set of CG transmissions. For example, the UE 120 may transmit n CG transmissions associated with a common bundle of CG transmissions. In some aspects, the UE 120 may store the n CG transmissions after transmitting the n CG transmissions. For example, the UE 120 may store the n CG transmissions to enable a retransmission of any of the n CG transmissions based at least in part on receiving a retransmission request for one or more of the n CG transmissions. In such an example, after a retransmission request period associated with the n CG transmissions is expired, the UE 120 may discard the n CG transmissions from data storage. In some aspects, the UE 120 may transmit UE capability signaling indicating a data storage capacity (a quantity of CG transmissions that can be stored) and may receive the CG configuration signaling identifying a value n for the quantity of CG transmissions based at least in part on the UE capability signaling.

As further shown in FIG. 6, and in a third operation 630, the UE 120 may monitor for a retransmission request in connection with every nth CG transmission and may receive a retransmission request. For example, after transmitting an nth CG transmission, the UE 120 may start an RTT timer, drx-HARQ-RTT-Timer UL as shown, and after expiration of the RTT timer may start a retransmission timer, drx-RetransmissionTimerUL, during which the UE 120 is in an active state monitoring for a PDCCH conveying DCI. In such an example, the UE 120 receives DCI including one or more retransmission requests for one or more CG transmissions within a bundle of CG transmissions (CG transmissions 1 to n, as shown).

In some aspects, the network node 110 may include, in the DCI, information indicating one or more packets that are to be transmitted. For example, the network node 110 may include a bitmap of length n indicating which of the n CG transmissions are to be retransmitted. Additionally or alternatively, the network node 110 may use DMRS sequence encoding to indicate one or more CG transmissions that are to be retransmitted. For example, the UE 120 may be configured with $2^n-1$ DMRS sequences to cover possible retransmission scenarios (combinations of retransmission requests) for the n CG transmissions. In such an example, there are $2^n$ possible combinations, but one combination is that there is no retransmission requested for any of the CG transmissions, in which case no DCI is transmitted requestion retransmission, resulting in only $2^n-1$ DMRS sequences being needed. Additionally or alternatively, the network node 110 may indicate one or more HARQ process identifiers corresponding to one or more CG transmissions that are to be retransmitted. For example, the DCI may include HARQ process identifiers of CG resources for which CG transmissions are to be retransmitted. In such an example, the quantity n of bundled CG transmissions is configured as less than or equal to a maximum quantity of different HARQ process identifiers that can be configured, such that each CG transmission within a bundle of CG transmissions is associated with a different HARQ process identifier.

As further shown in FIG. 6, and in a fourth operation 640, the UE 120 may transmit one or more retransmissions of one or more CG transmissions. For example, based at least in part on receiving the DCI indicating the one or more CG transmissions for which retransmission is requested, the UE 120 may transmit the one or more retransmissions of the one or more CG transmissions.

Figure 7:
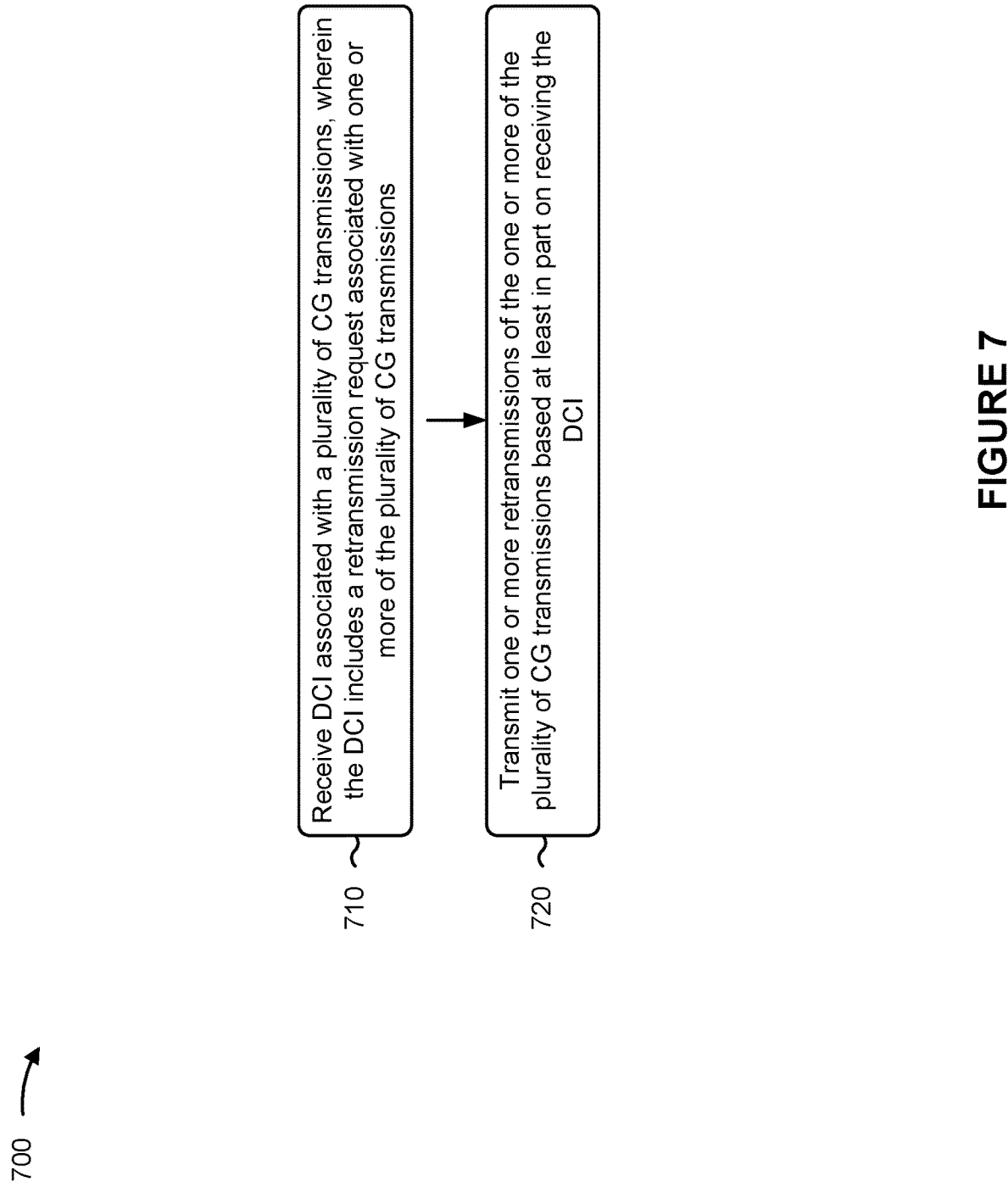
FIG. 7 is a flowchart illustrating an example process for uplink CG retransmission indication performed, for example, by a UE in accordance with the present disclosure.

FIG. 7 is a flowchart illustrating an example process 700 performed, for example, by a UE in accordance with the present disclosure. Example process 700 is an example where the UE (for example, UE 120) performs operations associated with uplink CG retransmission indication bundling.

As shown in FIG. 7, in some aspects, process 700 may include receiving DCI associated with a plurality of CG transmissions, wherein the DCI includes a retransmission request associated with one or more of the plurality of CG transmissions (block 710). For example, the UE (such as by using communication manager 140 or reception component 902, depicted in FIG. 9) may receive DCI associated with a plurality of CG transmissions, wherein the DCI includes a retransmission request associated with one or more of the plurality of CG transmissions, as described above.

As further shown in FIG. 7, in some aspects, process 700 may include transmitting one or more retransmissions of the one or more of the plurality of CG transmissions based at least in part on receiving the DCI (block 720). For example, the UE (such as by using communication manager 140 or transmission component 904, depicted in FIG. 9) may transmit one or more retransmissions of the one or more of the plurality of CG transmissions based at least in part on receiving the DCI, as described above.

Process 700 may include additional aspects, such as any single aspect or any combination of aspects described below or in connection with one or more other processes described elsewhere herein.

In a first additional aspect, process 700 includes forgoing monitoring for DCI in at least one monitoring occasion associated with at least one of the plurality of CG transmissions.

In a second additional aspect, alone or in combination with the first aspect, a value for a quantity of CG transmissions in the plurality of CG transmissions is based at least in part on a CG configuration.

In a third additional aspect, alone or in combination with one or more of the first and second aspects, a value for a quantity of CG transmissions in the plurality of CG transmissions is based at least in part on a parameter received in at least one of a radio resource control message, a MAC CE, or DCI.

In a fourth additional aspect, alone or in combination with one or more of the first through third aspects, the DCI includes a bitmap of bit indicators identifying the one or more of the plurality of CG transmissions for which the retransmission request is applicable.

In a fifth additional aspect, alone or in combination with one or more of the first through fourth aspects, the DCI includes a demodulation reference signal sequence identifying the one or more of the plurality of CG transmissions for which the retransmission request is applicable.

In a sixth additional aspect, alone or in combination with one or more of the first through fifth aspects, process 700 includes storing data of the plurality of CG transmissions, and retransmitting at least a portion of the stored data of the plurality of CG transmissions based at least in part on receiving the DCI.

In a seventh additional aspect, alone or in combination with one or more of the first through sixth aspects, process 700 includes transmitting UE capability information identifying a data storage capacity, and receiving configuration information identifying a value for a quantity of CG transmissions in the plurality of CG transmissions is based at least in part on the UE capability information.

In an eighth additional aspect, alone or in combination with one or more of the first through seventh aspects, process 700 includes receiving an indication of hybrid automatic repeat request process identifiers associated with the one or more of the plurality of CG transmissions, and transmitting the one or more retransmissions based at least in part on the indication of the hybrid automatic repeat request process identifiers.

In a ninth additional aspect, alone or in combination with one or more of the first through eighth aspects, a value for a quantity of CG transmissions in the plurality of CG transmissions is less than or equal to a quantity of the hybrid automatic repeat request process identifiers.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
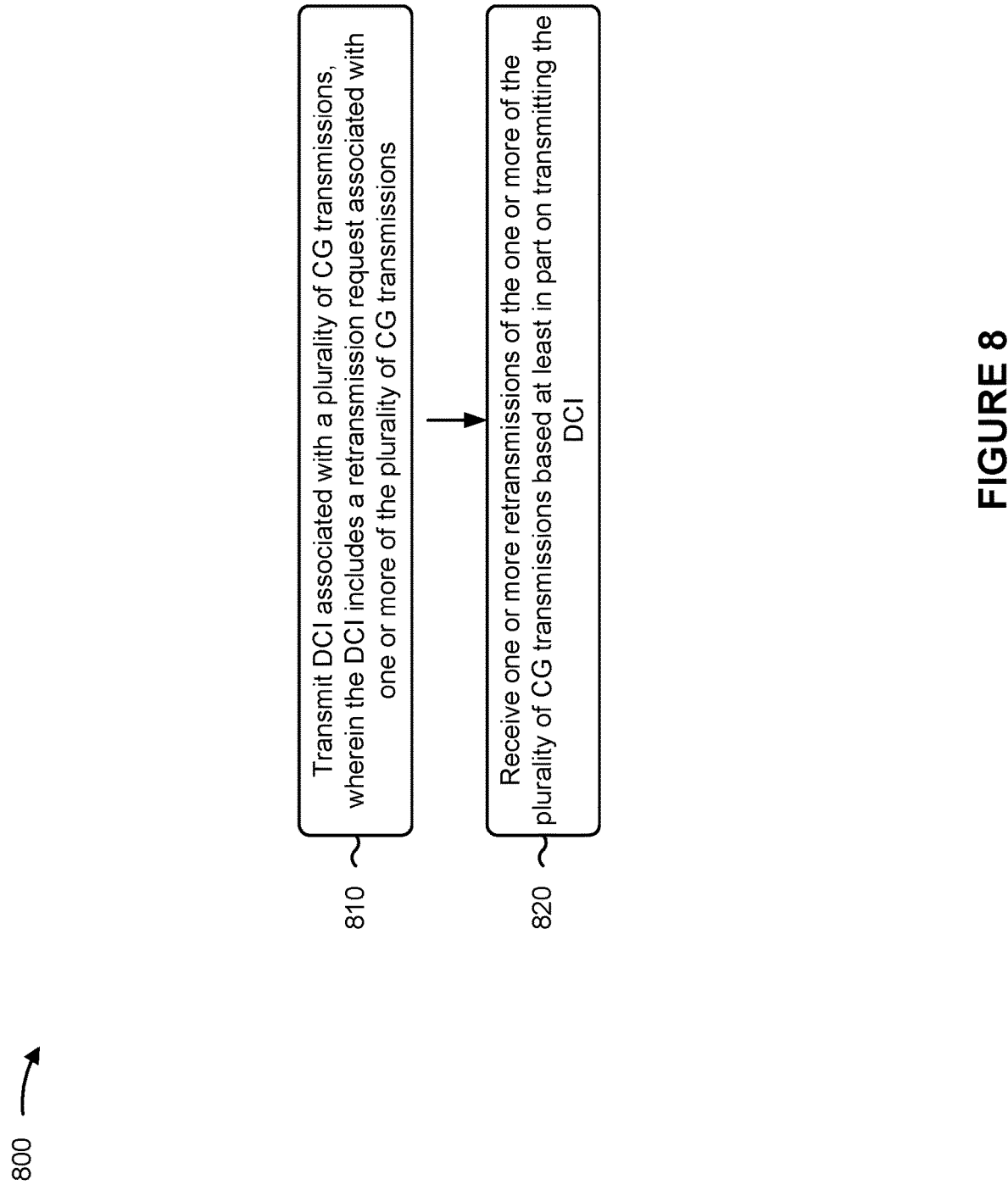
FIG. 8 is a flowchart illustrating an example process for uplink CG retransmission indication performed, for example, by a network node in accordance with the present disclosure.

FIG. 8 is a flowchart illustrating an example process 800 performed, for example, by a network node in accordance with the present disclosure. Example process 800 is an example where the network node (for example, network node 110) performs operations associated with uplink CG retransmission indication bundling.

As shown in FIG. 8, in some aspects, process 800 may include transmitting DCI associated with a plurality of CG transmissions, wherein the DCI includes a retransmission request associated with one or more of the plurality of CG transmissions (block 810). For example, the network node (such as by using communication manager 150 or transmission component 1004, depicted in FIG. 10) may transmit DCI associated with a plurality of CG transmissions, wherein the DCI includes a retransmission request associated with one or more of the plurality of CG transmissions, as described above.

As further shown in FIG. 8, in some aspects, process 800 may include receiving one or more retransmissions of the one or more of the plurality of CG transmissions based at least in part on transmitting the DCI (block 820). For example, the network node (such as by using communication manager 150 or reception component 1002, depicted in FIG. 10) may receive one or more retransmissions of the one or more of the plurality of CG transmissions based at least in part on transmitting the DCI, as described above.

Process 800 may include additional aspects, such as any single aspect or any combination of aspects described below or in connection with one or more other processes described elsewhere herein.

In a first additional aspect, process 800 includes forgoing transmitting DCI in at least one transmission occasion associated with at least one of the plurality of CG transmissions.

In a second additional aspect, alone or in combination with the first aspect, a value for a quantity of CG transmissions in the plurality of CG transmissions is based at least in part on a CG configuration.

In a third additional aspect, alone or in combination with one or more of the first and second aspects, a value for a quantity of CG transmissions in the plurality of CG transmissions is based at least in part on a parameter received in at least one of a radio resource control message, a MAC CE, or DCI.

In a fourth additional aspect, alone or in combination with one or more of the first through third aspects, the DCI includes a bitmap of bit indicators identifying the one or more of the plurality of CG transmissions for which the retransmission request is applicable.

In a fifth additional aspect, alone or in combination with one or more of the first through fourth aspects, the DCI includes a demodulation reference signal sequence identifying the one or more of the plurality of CG transmissions for which the retransmission request is applicable.

In a sixth additional aspect, alone or in combination with one or more of the first through fifth aspects, process 800 includes receiving UE capability information identifying a data storage capacity, and transmitting configuration information identifying a value for a quantity of CG transmissions in the plurality of CG transmissions is based at least in part on the UE capability information.

In a seventh additional aspect, alone or in combination with one or more of the first through sixth aspects, process 800 includes transmitting an indication of hybrid automatic repeat request process identifiers associated with the one or more of the plurality of CG transmissions, and receiving the one or more retransmissions based at least in part on the indication of the hybrid automatic repeat request process identifiers.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
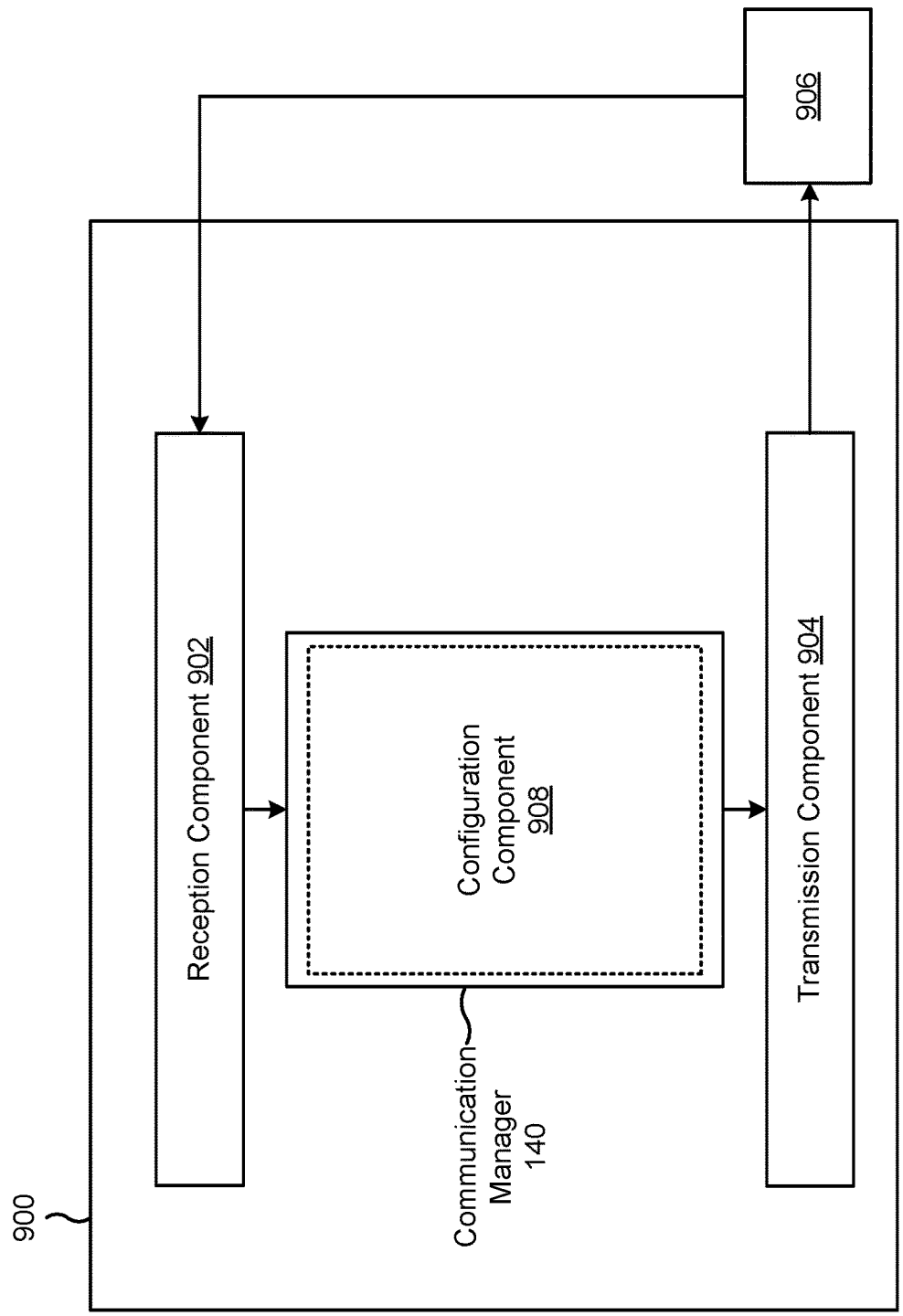
FIG. 9 is a diagram of an example apparatus for wireless communication in accordance with the present disclosure.

FIG. 9 is a diagram of an example apparatus 900 for wireless communication in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIG. 6. Additionally or alternatively, the apparatus 900 may be configured to perform one or more processes described herein, such as process 700 of FIG. 7. In some aspects, the apparatus 900 may include one or more components of the UE described above in connection with FIG. 2.

The reception component 902 may receive communications, such as reference signals, control information, data communications, or a combination thereof, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The communication manager 140 may receive or may cause the reception component 902 to receive DCI associated with a plurality of CG transmissions, wherein the DCI includes a retransmission request associated with one or more of the plurality of CG transmissions. The communication manager 140 may transmit or may cause the transmission component 904 to transmit one or more retransmissions of the one or more of the plurality of CG transmissions based at least in part on receiving the DCI. In some aspects, the communication manager 140 may perform one or more operations described elsewhere herein as being performed by one or more components of the communication manager 140.

The communication manager 140 may include a controller/processor, a memory, a scheduler, a communication unit, or a combination thereof, of the UE described above in connection with FIG. 2. In some aspects, the communication manager 140 includes a set of components, such as a configuration component 908. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive DCI associated with a plurality of CG transmissions, wherein the DCI includes a retransmission request associated with one or more of the plurality of CG transmissions. The transmission component 904 may transmit one or more retransmissions of the one or more of the plurality of CG transmissions based at least in part on receiving the DCI.

The reception component 902 may forgo monitoring for DCI in at least one monitoring occasion associated with at least one of the plurality of CG transmissions. A memory associated with the apparatus 900 may store data of the plurality of CG transmissions. The transmission component 904 may retransmit at least a portion of the stored data of the plurality of CG transmissions based at least in part on receiving the DCI. The transmission component 904 may transmit UE capability information identifying a data storage capacity. The reception component 902 may receive configuration information identifying a value for a quantity of CG transmissions in the plurality of CG transmissions is based at least in part on the UE capability information. The reception component 902 may receive an indication of hybrid automatic repeat request process identifiers associated with the one or more of the plurality of CG transmissions. The transmission component 904 may transmit the one or more retransmissions based at least in part on the indication of the hybrid automatic repeat request process identifiers. The configuration component 908 may configure monitoring for DCI in at least one monitoring occasion.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
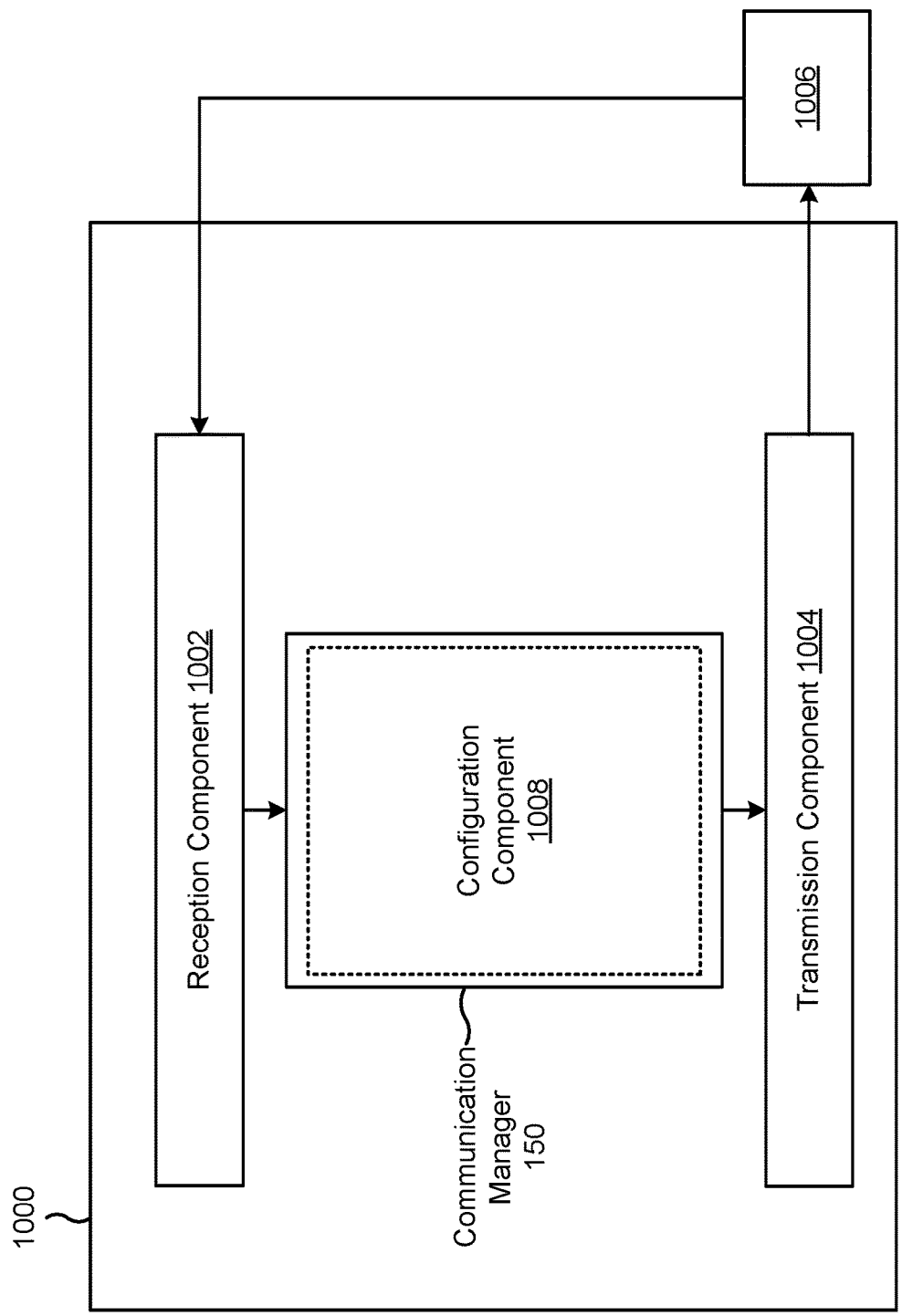
FIG. 10 is a diagram of an example apparatus for wireless communication in accordance with the present disclosure.

FIG. 10 is a diagram of an example apparatus 1000 for wireless communication in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to perform one or more operations described herein in connection with FIG. 6. Additionally or alternatively, the apparatus 1000 may be configured to perform one or more processes described herein, such as process 800 of FIG. 8. In some aspects, the apparatus 1000 may include one or more components of the network node described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the network node described above in connection with FIG. 2.

The transmission component 1004 may transmit communications, such as reference signals, control information, data communications, or a combination thereof, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described above in connection with FIG. 2. In some aspects, the transmission component 1004 may be co-located with the reception component 1002 in a transceiver.

The communication manager 150 may transmit or may cause the transmission component 1004 to transmit DCI associated with a plurality of CG transmissions, wherein the DCI includes a retransmission request associated with one or more of the plurality of CG transmissions. The communication manager 150 may receive or may cause the reception component 1002 to receive one or more retransmissions of the one or more of the plurality of CG transmissions based at least in part on transmitting the DCI. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a configuration component 1008. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1004 may transmit DCI associated with a plurality of CG transmissions, wherein the DCI includes a retransmission request associated with one or more of the plurality of CG transmissions. The reception component 1002 may receive one or more retransmissions of the one or more of the plurality of CG transmissions based at least in part on transmitting the DCI. The transmission component 1004 may forgo transmitting DCI in at least one transmission occasion associated with at least one of the plurality of CG transmissions. The reception component 1002 may receive UE capability information identifying a data storage capacity. The transmission component 1004 may transmit configuration information identifying a value for a quantity of CG transmissions in the plurality of CG transmissions is based at least in part on the UE capability information. The transmission component 1004 may transmit an indication of hybrid automatic repeat request process identifiers associated with the one or more of the plurality of CG transmissions. The reception component 1002 may receive the one or more retransmissions based at least in part on the indication of the hybrid automatic repeat request process identifiers. The configuration component 1008 may configure DCI to convey one or more retransmission requests associated with one or more of the plurality of CG transmissions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving downlink control information (DCI) associated with a plurality of configured grant (CG) transmissions, wherein the DCI includes a retransmission request associated with one or more of the plurality of CG transmissions; and transmitting one or more retransmissions of the one or more of the plurality of CG transmissions based at least in part on receiving the DCI.

Aspect 2: The method of Aspect 1, comprising: forgoing monitoring for DCI in at least one monitoring occasion associated with at least one of the plurality of CG transmissions.

Aspect 3: The method of any of Aspects 1 to 2, wherein a value for a quantity of CG transmissions in the plurality of CG transmissions is based at least in part on a CG configuration.

Aspect 4: The method of any of Aspects 1 to 3, wherein a value for a quantity of CG transmissions in the plurality of CG transmissions is based at least in part on a parameter received in at least one of: a radio resource control message, a medium access control (MAC) control element, or DCI.

Aspect 5: The method of any of Aspects 1 to 4, wherein the DCI includes a bitmap of bit indicators identifying the one or more of the plurality of CG transmissions for which the retransmission request is applicable.

Aspect 6: The method of any of Aspects 1 to 5, wherein the DCI includes a demodulation reference signal sequence identifying the one or more of the plurality of CG transmissions for which the retransmission request is applicable.

Aspect 7: The method of any of Aspects 1 to 6, comprising: storing data of the plurality of CG transmissions; and retransmitting at least a portion of the stored data of the plurality of CG transmissions based at least in part on receiving the DCI.

Aspect 8: The method of any of Aspects 1 to 7, comprising: transmitting UE capability information identifying a data storage capacity; and receiving configuration information identifying a value for a quantity of CG transmissions in the plurality of CG transmissions is based at least in part on the UE capability information.

Aspect 9: The method of any of Aspects 1 to 8, comprising: receiving an indication of hybrid automatic repeat request process identifiers associated with the one or more of the plurality of CG transmissions; and transmitting the one or more retransmissions based at least in part on the indication of the hybrid automatic repeat request process identifiers.

Aspect 10: The method of Aspect 9, wherein a value for a quantity of CG transmissions in the plurality of CG transmissions is less than or equal to a quantity of the hybrid automatic repeat request process identifiers.

Aspect 11: A method of wireless communication performed by a network node, comprising: transmitting downlink control information (DCI) associated with a plurality of configured grant (CG) transmissions, wherein the DCI includes a retransmission request associated with one or more of the plurality of CG transmissions; and receiving one or more retransmissions of the one or more of the plurality of CG transmissions based at least in part on transmitting the DCI.

Aspect 12: The method of Aspect 11, comprising: forgoing transmitting DCI in at least one transmission occasion associated with at least one of the plurality of CG transmissions.

Aspect 13: The method of any of Aspects 11 to 12, wherein a value for a quantity of CG transmissions in the plurality of CG transmissions is based at least in part on a CG configuration.

Aspect 14: The method of any of Aspects 11 to 13, wherein a value for a quantity of CG transmissions in the plurality of CG transmissions is based at least in part on a parameter received in at least one of: a radio resource control message, a medium access control (MAC) control element, or DCI.

Aspect 15: The method of any of Aspects 11 to 14, wherein the DCI includes a bitmap of bit indicators identifying the one or more of the plurality of CG transmissions for which the retransmission request is applicable.

Aspect 16: The method of any of Aspects 11 to 15, wherein the DCI includes a demodulation reference signal sequence identifying the one or more of the plurality of CG transmissions for which the retransmission request is applicable.

Aspect 17: The method of any of Aspects 11 to 16, comprising: receiving UE capability information identifying a data storage capacity; and transmitting configuration information identifying a value for a quantity of CG transmissions in the plurality of CG transmissions is based at least in part on the UE capability information.

Aspect 18: The method of any of Aspects 11 to 17, comprising: transmitting an indication of hybrid automatic repeat request process identifiers associated with the one or more of the plurality of CG transmissions; and receiving the one or more retransmissions based at least in part on the indication of the hybrid automatic repeat request process identifiers.

Aspect 19: The method of Aspect 18, wherein a value for a quantity of CG transmissions in the plurality of CG transmissions is less than or equal to a quantity of the hybrid automatic repeat request process identifiers.

Aspect 20: An apparatus for wireless communication at a device, comprising a processor; memory coupled with the processor; and instructions stored in the memory and executable by the processor to cause the apparatus to perform the method of one or more of Aspects 1-10.

Aspect 21: A device for wireless communication, comprising a memory and one or more processors coupled to the memory, the one or more processors configured to perform the method of one or more of Aspects 1-10.

Aspect 22: An apparatus for wireless communication, comprising at least one means for performing the method of one or more of Aspects 1-10.

Aspect 23: A non-transitory computer-readable medium storing code for wireless communication, the code comprising instructions executable by a processor to perform the method of one or more of Aspects 1-10.

Aspect 24: A non-transitory computer-readable medium storing a set of instructions for wireless communication, the set of instructions comprising one or more instructions that, when executed by one or more processors of a device, cause the device to perform the method of one or more of Aspects 1-10.

Aspect 25: An apparatus for wireless communication at a device, comprising a processor; memory coupled with the processor; and instructions stored in the memory and executable by the processor to cause the apparatus to perform the method of one or more of Aspects 11-19.

Aspect 26: A device for wireless communication, comprising a memory and one or more processors coupled to the memory, the one or more processors configured to perform the method of one or more of Aspects 11-19.

Aspect 27: An apparatus for wireless communication, comprising at least one means for performing the method of one or more of Aspects 11-19.

Aspect 28: A non-transitory computer-readable medium storing code for wireless communication, the code comprising instructions executable by a processor to perform the method of one or more of Aspects 11-19.

Aspect 29: A non-transitory computer-readable medium storing a set of instructions for wireless communication, the set of instructions comprising one or more instructions that, when executed by one or more processors of a device, cause the device to perform the method of one or more of Aspects 11-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one memory; and
at least one processor communicatively coupled with the at least one memory, the at least one processor configured to cause the UE to:
receive information indicating a quantity of configured grant (CG) transmissions;
monitor for downlink control information (DCI) after the quantity of CG transmissions, wherein the DCI includes a retransmission request associated with one or more CG transmissions of the quantity of CG transmissions; and
transmit one or more retransmissions of the one or more CG transmissions based at least in part on a reception of the DCI.

2. The UE of claim 1, wherein a value for the quantity of CG transmissions is based at least in part on a CG configuration.

3. The UE of claim 1, wherein a value for the quantity of CG transmissions is based at least in part on a parameter received in at least one of:
a radio resource control message,
a medium access control (MAC) control element, or
DCI.

4. The UE of claim 1, wherein the DCI includes a bitmap of bit indicators identifying the one or more CG transmissions for which the retransmission request is applicable.

5. The UE of claim 1, wherein the DCI includes a demodulation reference signal sequence identifying the one or more CG transmissions for which the retransmission request is applicable.

6. The UE of claim 1, wherein the at least one processor is further configured to cause the UE to:
store data of the one or more CG transmissions; and
retransmit at least a portion of the stored data based at least in part on the reception of the DCI.

7. The UE of claim 1, wherein the at least one processor is further configured to cause the UE to:
transmit UE capability information identifying a data storage capacity; and
wherein the at least one processor, to receive the information indicating the quantity of CG transmissions, is configured to receive the information indicating the quantity of CG transmissions based at least in part on the UE capability information.

8. The UE of claim 1, wherein the at least one processor is further configured to cause the UE to:
receive an indication of hybrid automatic repeat request process identifiers associated with the one or more CG transmissions; and
wherein the at least one processor, to transmit the one or more retransmissions, is configured to cause the UE to transmit the one or more retransmissions based at least in part on the indication of the hybrid automatic repeat request process identifiers.

9. The UE of claim 8, wherein a value for the quantity of CG transmissions is less than or equal to a quantity of the hybrid automatic repeat request process identifiers.

10. A network node for wireless communication, comprising:
at least one memory; and
at least one processor communicatively coupled with the at least one memory, the at least one processor configured to cause the network node to:
transmit information indicating a quantity of configured grant (CG) transmissions;
transmit downlink control information (DCI) associated with one or more CG transmissions of the quantity of CG transmissions, wherein the DCI includes a retransmission request associated with the one or more CG transmissions; and
receive one or more retransmissions of the one or more CG transmissions based at least in part on transmission of the DCI.

11. The network node of claim 10, wherein the at least one processor is further configured to cause the network node to:
forgo transmitting the DCI in at least one transmission occasion associated with at least one CG transmission of the quantity of CG transmissions.

12. The network node of claim 10, wherein a value for the quantity of CG transmissions is based at least in part on a CG configuration.

13. The network node of claim 11, wherein a value for the quantity of CG transmissions is based at least in part on a parameter received in at least one of:
a radio resource control message,
a medium access control (MAC) control element, or
DCI.

14. The network node of claim 10, wherein the DCI includes a bitmap of bit indicators identifying the one or more CG transmissions for which the retransmission request is applicable.

15. The network node of claim 10, wherein the DCI includes a demodulation reference signal sequence identifying the one or more CG transmissions for which the retransmission request is applicable.

16. The network node of claim 10, wherein the at least one processor is further configured to cause the network node to:
receive UE capability information identifying a data storage capacity; and
transmit configuration information identifying a value for the quantity of CG transmissions is based at least in part on the UE capability information.

17. The network node of claim 10, wherein the at least one processor is further configured to cause the network node to:
transmit an indication of hybrid automatic repeat request process identifiers associated with the one or more CG transmissions; and
receive the one or more retransmissions based at least in part on the indication of the hybrid automatic repeat request process identifiers.

18. The network node of claim 17, wherein a value for the quantity of CG transmissions is less than or equal to a quantity of the hybrid automatic repeat request process identifiers.

19. A method of wireless communication performed by a user equipment (UE), comprising:
receiving information indicating a quantity of configured grant (CG) transmissions;
monitoring for downlink control information (DCI) after the quantity of CG transmissions, wherein the DCI includes a retransmission request associated with one or more CG transmissions of the quantity of CG transmissions; and
transmitting one or more retransmissions of the one or more CG transmissions based at least in part on receiving the DCI.

20. The method of claim 19, wherein a value for the quantity of CG transmissions is based at least in part on a CG configuration.

21. The method of claim 19, wherein a value for the quantity of CG transmissions is based at least in part on a parameter received in at least one of:
 a radio resource control message,
 a medium access control (MAC) control element, or
 DCI.

22. The method of claim 19, wherein the DCI includes a bitmap of bit indicators identifying the one or more CG transmissions for which the retransmission request is applicable.

23. The method of claim 19, wherein the DCI includes a demodulation reference signal sequence identifying the one or more CG transmissions for which the retransmission request is applicable.

24. The method of claim 19, comprising:
 storing data of the one or more CG transmissions; and
 retransmitting at least a portion of the stored data based at least in part on receiving the DCI.

25. The method of claim 19, comprising:
 transmitting UE capability information identifying a data storage capacity; and
 receiving configuration information identifying a value for the quantity of CG transmissions is based at least in part on the UE capability information.

26. A method of wireless communication performed by a network node, comprising:
 transmitting information indicating a quantity of configured grant (CG) transmissions;
 transmitting downlink control information (DCI) associated with one or more CG transmissions of the quantity of CG transmissions, wherein the DCI includes a retransmission request associated with the one or more CG transmissions; and
 receiving one or more retransmissions of the one or more CG transmissions based at least in part on transmitting the DCI.

27. The method of claim 26, comprising:
 forgoing transmitting the DCI in at least one transmission occasion associated with at least one CG transmission of the quantity of CG transmissions.

28. The method of claim 26, wherein a value for the quantity of CG transmissions is based at least in part on a CG configuration.

29. The method of claim 26, wherein a value for the quantity of CG transmissions is based at least in part on a parameter received in at least one of:
 a radio resource control message,
 a medium access control (MAC) control element, or
 DCI.

30. The method of claim 26, wherein the DCI includes a bitmap of bit indicators identifying the one or more CG transmissions for which the retransmission request is applicable.

* * * * *